United States Patent [19]

Preusker

[11] Patent Number: 5,307,852
[45] Date of Patent: May 3, 1994

[54] CHAIN LINK FOR THE ANTISKID DEVICE OF A VEHICLE WHEEL

[75] Inventor: Werner Preusker, Sauldorf, Fed. Rep. of Germany

[73] Assignee: Confon AG, Rheineck, Switzerland

[21] Appl. No.: 5,001

[22] Filed: Jan. 15, 1993

[30] Foreign Application Priority Data

Feb. 4, 1992 [DE] Fed. Rep. of Germany ....... 9201340

[51] Int. Cl.⁵ ............................................. B60C 27/06
[52] U.S. Cl. .................................... 152/243; 152/241; 152/233; 59/78; 59/93
[58] Field of Search ............... 152/233, 231, 241, 243, 152/244, 213 A, 213 R; 59/84, 85, 90, 92, 78, 93

[56] References Cited

U.S. PATENT DOCUMENTS

| | | | |
|---|---|---|---|
| 1,382,045 | 6/1921 | Zigler | 152/213 R |
| 1,572,980 | 2/1926 | Young | 152/243 |
| 1,596,633 | 8/1926 | Small | 152/230 |
| 1,757,252 | 5/1930 | Johnson | 59/85 |
| 2,107,431 | 2/1958 | Taylor | 152/243 |
| 2,344,972 | 3/1944 | Copp | 152/233 |
| 2,952,290 | 9/1960 | Gaspardo | 152/241 |
| 3,362,450 | 1/1968 | Brown | 152/233 |
| 3,857,428 | 12/1974 | Dolphin | 152/243 |
| 4,063,583 | 12/1977 | Rieger et al. | 152/241 |
| 4,836,258 | 6/1989 | Ellis | 152/213 X |

FOREIGN PATENT DOCUMENTS

| | | |
|---|---|---|
| 1052842 | 3/1959 | Fed. Rep. of Germany . |
| 2813492 | 9/1979 | Fed. Rep. of Germany . |
| 0309808 | 12/1989 | Japan . |

Primary Examiner—Michael W. Ball
Assistant Examiner—Francis J. Lorin
Attorney, Agent, or Firm—Herbert Dubno; Yuri Kateshov

[57] ABSTRACT

A chain link for the antiskid device of a vehicle wheel, having a first end forming a closed eyelet for attachment to an adjacent chain link, and a second end forming a hook for attachment in an opening of a web or plate or arm of the antiskid device, the eyelet and hook having the equal inside width corresponding to the thickness of the web in the zone of the place of attachment, plus a slight extra dimension for adequate mobility upon the attachment.

3 Claims, 1 Drawing Sheet

CHAIN LINK FOR THE ANTISKID DEVICE OF A VEHICLE WHEEL

FIELD OF THE INVENTION

The invention relates to a chain link for the antiskid device of a vehicle wheel, having a first end forming a closed eyelet for attachment to an adjacent chain link, and a second end forming a hook for attachment in an opening of a web or plate or arm of the antiskid device.

BACKGROUND OF THE INVENTION

In addition to snow chains, antiskid devices are known in which the antiskid means bearing against the wheel running surface is retained by arms which bear against the running surface and are attached to a retaining device which, in turn, is attached to the side of the wheel. The chain links must be readily and reliably attached to the plastics arms of an antiskid device mounted on a wheel. For this purpose it is known to construct the end link of a chain in the form of a hook which is hooked into an opening of the arm or of a web-shaped or plate-shaped intermediate member. It was found that such hook-shaped end links are subject to increased stressing and even break.

OBJECTS OF THE INVENTION

It is an object of the invention to improve the hook-shaped end links of an antiskid device so that they are subjected to less stress.

SUMMARY OF THE INVENTION

This problem is solved according to the invention by the features that an inside width of the eyelet engaging part of the hook is equal to a thickness of the web, plate or arm in the zone of attachment with a respective adjacent chain link plus a slight extra dimension for adequate mobility, the inside diameter of an eyelet being equal to the inside width of the hook.

Due to the improved structure the external diameter of the eyelet of the hook link corresponds to the external diameter of the hook zone, so that the eyelet ensures that the hook end is not forced inwards, thereby preventing the hook end from being subjected to heavy wear or even breaking off in the zone of the bend of the hook.

Particularly advantageously the chain link is made from a hardened steel. Also advantageously a hook link is attached on each side of a closed connecting chain link.

A better hold is obtained if the hook end of the hook member is bent down laterally. Longitudinal adaptation can be achieved by the feature that the connecting chain link has different lengths.

SPECIFIC DESCRIPTION

Figure 1:
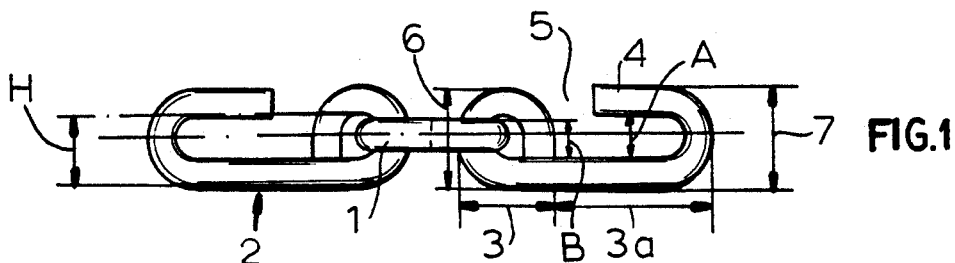
FIG. 1 is a three-link chain portion with two hook-shaped chain links.

Two outer hook links 2 are attached to a central chain connecting link 1. The wire of each hook link 2 is bent over to form a substantially circular closed eyelet 3 to engage around each connecting link 1.

The other end of the wheel member of the hook link 2 is bent over to form a hook 3a whose hook end 4 points in the direction of the eyelet 3. Disposed between the hook end 4 and the eyelet 3 is an opening 5 enabling the hook link 2 to be hooked into an opening of a plate-shaped or web-shaped member, more particularly a retaining arm. The internal width A or B of the chain link 9 is equal to the thickness of the web, plate or arm in the zone of the place of attachment plus a small additional dimension for an adequate mobility of the hook link 2.

The eyelet 3 is so dimensioned that the internal diameter B of the eyelet corresponding to the internal thickness of the link is equal to the internal width A of the hook. The outer diameter 6 of the eyelet is equal to the outer width 7 of the hook. As a result, the diameter 6 prevents the hook end 4 from being bent inwards when the hook link 2 is disposed between the vehicle wheel and the road. This not only reduces the wear on the hook end 4, but also ensures that the hook end 4 does not break off.

Figure 2:
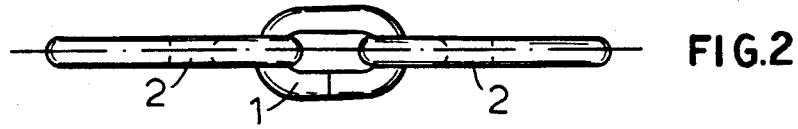
FIG. 2 is a side elevation of view in a direction indicated by a view 2 in FIG. 1, FIGS. 3A-3C are different cross sections of the wire.
Figure 4:
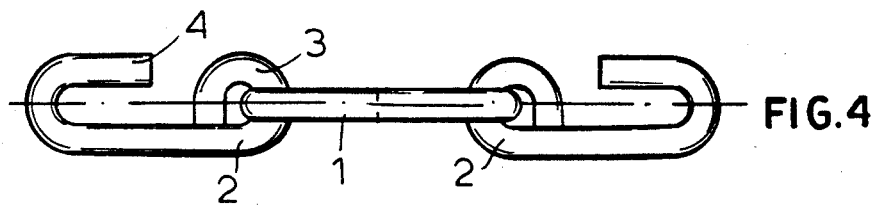
FIGS. 4 and 5 are a three-link chain portion according to the invention and analogous to one shown in FIG. 1 but having a longer connecting chain link.
Figure 5:
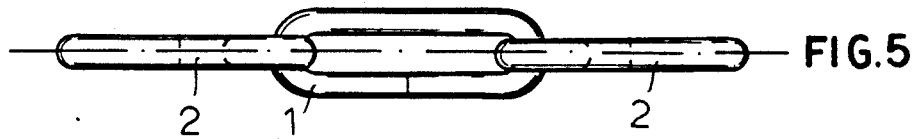
Figure 6:
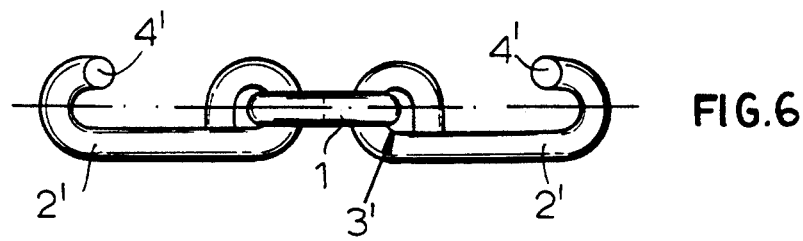
FIGS. 6 and 7 show a hook link with bent-down hook end.
Figure 7:
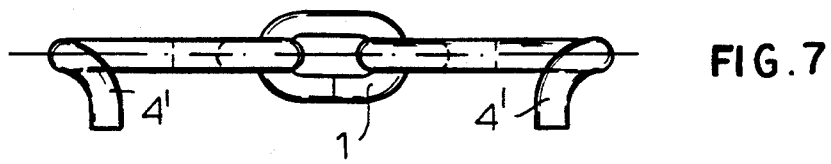
Figure 8:
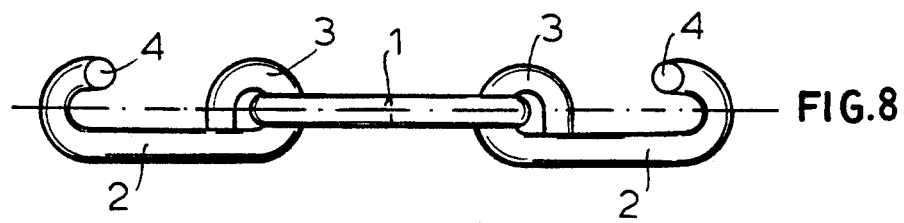
FIGS. 8 and 9 show the embodiment illustrated in FIGS. 6 and 7 with a longer connecting link.
Figure 9:
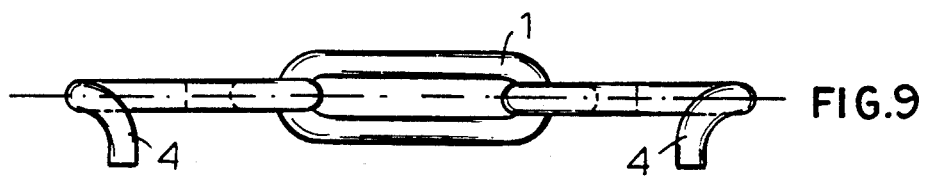

In alternative embodiments (FIGS. 6 to 9) shows a shank 2' lying in a general plane with a respective eyelet portion 3' identical to one shown in FIGS. 1-5 and with a respective U-shaped hook having a remote end 4' bent so that it lies in a respective plane extending horizontally perpendicular to the plane of shank. The wire cross-section of the chain links can have other shapes than round. FIG. 3 also shows a square and a U-shaped cross-section.

Different overall lengths can be obtained by different lengths of the connecting link 1.

I claim:

1. A vehicle wheel chain comprising:
   a closed connecting link; and
   a pair of spaced apart chain links interconnected with said connecting link, each of said chain links comprising:
   a respective elongated shank formed with opposite ends and having a uniform thickness, said shank being formed with:
   a respective generally U-shaped hook formed on one of said ends and having a proximal portion extending outwardly from the shank, said hook being formed with a remote portion extending from said proximal portion, said remote portion being formed with an inner edge facing said shank and spaced therefrom at a distance and with an outer edge turned away from said shank and lying in a plane, and
   a closed eyelet formed on the other end and extending outwardly from said shank, said eyelet being formed with a curved portion having a respective outer edge with which the plane is tangential and an end portion remote from said other end and running inwardly from said curvature portion toward and abutting said shank, said eyelet receiving the connecting link and having an inner diameter which is equal to said distance but is slightly greater than said thickness, said eyelet thereby preventing said hook from bending inwardly toward said shank when the chain link is disposed between a vehicle wheel and a road.

2. The vehicle wheel chain defined in claim 1 wherein said connecting link has a length which can be varied.

3. The vehicle wheel chain defined in claim 1 wherein each of said chain links is made of hardened steel.

* * * * *